United States Patent
Nord et al.

(10) Patent No.: US 12,120,637 B2
(45) Date of Patent: Oct. 15, 2024

(54) COMMUNICATION GAPS FOR PAGING OF MULTI-SUBSCRIBER IDENTITY WIRELESS COMMUNICATION DEVICES

(71) Applicant: Sony Group Corporation, Tokyo (JP)

(72) Inventors: Lars Nord, Lund (SE); Torgny Palenius, Barsebäck (SE)

(73) Assignee: Sony Group Corporation, Tokyo (JP)

(*) Notice: Subject to any disclaimer, the term of this patent is extended or adjusted under 35 U.S.C. 154(b) by 440 days.

(21) Appl. No.: 17/598,804

(22) PCT Filed: Apr. 3, 2020

(86) PCT No.: PCT/EP2020/059607
§ 371 (c)(1),
(2) Date: Sep. 27, 2021

(87) PCT Pub. No.: WO2020/207928
PCT Pub. Date: Oct. 15, 2020

(65) Prior Publication Data
US 2022/0191825 A1     Jun. 16, 2022

(30) Foreign Application Priority Data
Apr. 11, 2019   (SE) .................................. 1930120-9

(51) Int. Cl.
*H04W 68/02* (2009.01)
*H04W 72/1263* (2023.01)
*H04W 88/06* (2009.01)

(52) U.S. Cl.
CPC ....... *H04W 68/02* (2013.01); *H04W 72/1263* (2013.01); *H04W 88/06* (2013.01)

(58) Field of Classification Search
CPC . H04W 68/02; H04W 72/1263; H04W 88/06; H04W 72/21; H04W 8/183; H04W 24/10; H04W 76/28

(Continued)

(56) References Cited

U.S. PATENT DOCUMENTS

2010/0062795 A1   3/2010   Lee
2012/0190362 A1*  7/2012   Subbarayudu ........ H04W 76/28
                                                    455/435.1

(Continued)

FOREIGN PATENT DOCUMENTS

CN   102422688 A   4/2012
CN   102484865 A   5/2012

(Continued)

OTHER PUBLICATIONS

3GPP TSG-SA WG1 Meeting # 85, General service requirements for enabling Multi-USIM devices support, Intel , Feb. 2019 (Year: 2019).*

(Continued)

*Primary Examiner* — Tanmay K Shah
(74) *Attorney, Agent, or Firm* — Tucker Ellis LLP

(57) ABSTRACT

A method of operating a wireless communication device (101) includes transmitting (5001), to a first communication network (100-1), a request (4002) for one or more communication gaps (551) in a communication along a data connection (189) associated with a first identity (451) of the wireless communication device (101) and monitoring (5004), in accordance with a timing of the one or more communication gaps (551), for one or more paging signals (4004, 4005) from a second communication network (100-2), the one or more paging signals (4004, 4005) being associated with a second identity (452) of the wireless communication device (101).

17 Claims, 8 Drawing Sheets

(58) Field of Classification Search
USPC .......................................................... 455/458
See application file for complete search history.

(56) References Cited

U.S. PATENT DOCUMENTS

| | | | |
|---|---|---|---|
| 2014/0038569 | A1 | 2/2014 | Chin |
| 2014/0119293 | A1 | 5/2014 | Sikri |
| 2015/0057046 | A1 | 2/2015 | Challa |
| 2015/0271822 | A1 | 9/2015 | Batchu |
| 2016/0037329 | A1 | 2/2016 | Chong |
| 2017/0127272 | A1 | 5/2017 | Kela |
| 2017/0127439 | A1 | 5/2017 | Gopal |
| 2017/0208603 | A1 | 7/2017 | Goel |
| 2017/0289889 | A1 | 10/2017 | Sahu |
| 2018/0077728 | A1 | 3/2018 | Shi |

FOREIGN PATENT DOCUMENTS

| | | |
|---|---|---|
| CN | 103283290 A | 9/2013 |
| CN | 108353381 A | 7/2018 |
| CN | 108605281 A | 9/2018 |
| CN | 108702732 A | 10/2018 |
| CN | 108834143 A | 11/2018 |
| JP | 2010506516 A | 2/2010 |
| JP | 2014504125 A | 2/2014 |
| JP | 2016528853 A | 9/2016 |
| WO | WO-2016053552 A1 | 4/2016 |
| WO | WO-2018206821 A1 | 11/2018 |

OTHER PUBLICATIONS

International Search Report and Written Opinion from corresponding International Application No. PCT/EP2020/059607, Jun. 24, 2020, 14 pages.

Intel, "General Service requirements for enabling Multi-USIM devices support", 3GPP TSG-SA WG1 Meeting #85, S1-190116, Feb. 18-22, 2019, 4 pages.

Vivo, "Solution# X: Paging reception for multi-USIM device with 1Rx", 3GPP SA WG2 Meeting #136, S2-1910984, Nov. 18-22, 2019, 10 pages.

Apple, "UE Assisted RRC State Transition", 3GPP TSG-RAN WG2 Meeting #105bis, R2-1903606, Mar. 29, 2019.

* cited by examiner

COMMUNICATION GAPS FOR PAGING OF MULTI-SUBSCRIBER IDENTITY WIRELESS COMMUNICATION DEVICES

TECHNICAL FIELD

Various examples generally relate to paging of wireless communication devices that are capable of connecting to at least one communication network using multiple identities. Various examples specifically relate to techniques of providing communication gaps for such paging.

BACKGROUND

Mobile communication using wireless communication devices is widespread. Some wireless communication devices (user equipment, UE) are capable of connecting to at least one communication network using multiple identities. Such UEs can have, e.g., multiple subscriber identity modules (SIMs). Hence, sometimes, these UEs are capable of connecting to at least one communication network using multiple identities are referred to multi-SIM UEs.

To reduce energy consumption, UEs can sometimes operate in an idle mode. In the idle mode, a data connection with the communication network—previously set up by connecting to the communication network—is released. As such, the idle mode is distinguished against a connected mode in which the data connection is set up and data can be communicated between the communication network and the UE along the data connection. When the UE operates in idle mode, the communication network can trigger a transition from idle mode to connected mode. This transition can be triggered by downlink (DL) paging signals that are transmitted by a base station (BS) of a radio access network (RAN) of the communication network. The paging signals are transmitted in accordance with a timing of paging occasions (PO). The UE is configured to monitor for paging signals at the POs.

Sometimes, multi-SIM UEs include a single wireless interface. This means that a single analog frontend and digital frontend is available to handle the communication associated with multiple identities. Nonetheless, the multi-SIM UE shall be able to receive the paging signals associated with the multiple identities. Since the POs are time-limited, there is a risk of conflicts. This can degrade the paging reliability.

SUMMARY

Therefore, a need exists for advanced techniques of operating multi-SIM UEs. More specifically, a need exists for advanced techniques of paging multi-SIM UEs.

This need is met by the features of the independent claims. The features of the dependent claims define embodiments.

A method of operating a wireless communication device includes transmitting, to a first communication network, a request. The request is for one or more communication gaps in a communication along a data connection. The data connection is associated with a first identity of the wireless communication device. The method also includes monitoring, in accordance with a timing of the one or more communication gaps, for one or more paging signals from a second communication network. The one or more paging signals are associated with a second identity of the wireless communication device.

A computer program or a computer-program product or a computer-readable storage medium includes program code. The program code can be executed by at least one processor. When executing the program code, the at least one processor performs a method of operating a wireless communication device. The method includes transmitting, to a first communication network, a request. The request is for one or more communication gaps in a communication along a data connection. The data connection is associated with a first identity of the wireless communication device. The method also includes monitoring, in accordance with a timing of the one or more communication gaps, for one or more paging signals from a second communication network. The one or more paging signals are associated with a second identity of the wireless communication device.

A wireless communication device includes a control circuitry. The control circuitry is configured to transmit, to a first communication network, a request for one or more communication gaps in a communication along a data connection associated with a first identity of the wireless communication device. The control circuitry is further configured to monitor, in accordance with a timing of the one or more communication gaps, for one or more paging signals from a second communication network, the one or more paging signals being associated with a second identity of the wireless communication device.

A method of operating a node of a first communication network includes obtaining, from a wireless communication device, a request for one or more communication gaps in a communication. The communication is along a data connection associated with a first identity of the wireless communication device. The one or more communication gaps are for one or more paging signals from a second communication network. The method also includes configuring scheduling of allocations for data of the communication in accordance with a timing of the one or more communication gaps.

A computer program or a computer-program product or a computer-readable storage medium includes program code. The program code can be executed by at least one processor. When executing the program code, the at least one processor performs a method of operating a node of a first communication network. The method includes obtaining, from a wireless communication device, a request for one or more communication gaps in a communication. The communication is along a data connection associated with a first identity of the wireless communication device. The one or more communication gaps are for one or more paging signals from a second communication network. The method also includes configuring scheduling of allocations for data of the communication in accordance with a timing of the one or more communication gaps.

A node of a first communication network includes control circuitry. The control circuitry is configured to obtain, from a wireless communication device, a request for one or more communication gaps in a communication along a data connection associated with a first identity of the wireless communication device. The one or more communication gaps are for one or more paging signals from a second communication network. The control circuitry is also configured to configure scheduling of allocations for data of the communication in accordance with a timing of the one or more communication gaps.

The various examples described above can be combined with each other in further examples.

DETAILED DESCRIPTION OF EMBODIMENTS

Figure 1:
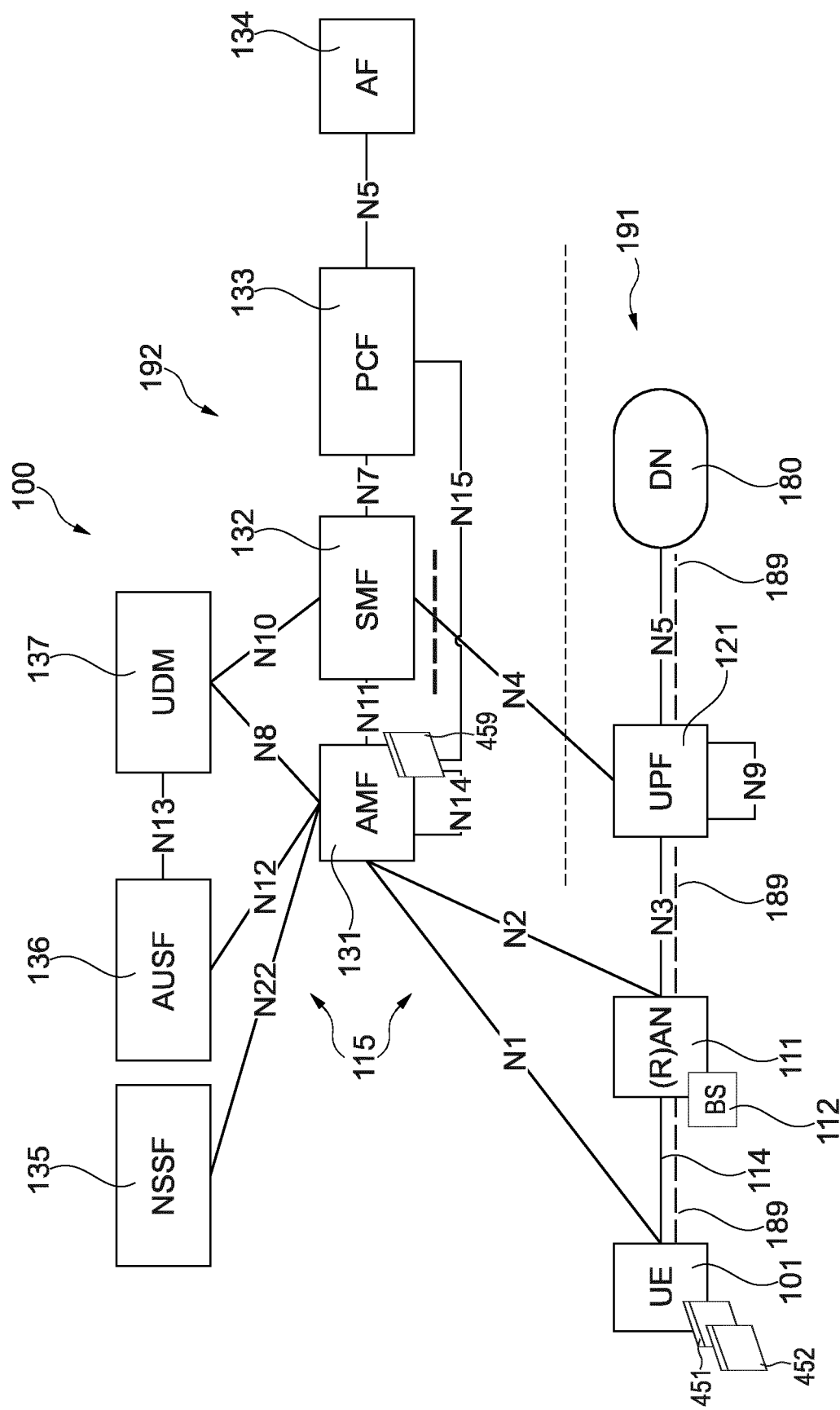
FIG. 1 schematically illustrates a cellular network according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a UE and a BS of a communication network, e.g., of a cellular network. The communication system may include a wireless link between the UE and the BS. DL signals may be transmitted by the BS and received by the UE. Uplink (UL) signals may be transmitted by the UE and received by the BS.

Hereinafter, techniques of operating a UE in various modes are described. The modes may include a connected mode and an idle mode. Further, hereinafter, techniques of transitioning or triggering transition between the multiple mode, e.g., from idle mode to connected mode are described. This transition can be triggered by paging signals.

A data connection may be established between the UE and a network in the connected mode; transmission of data—including application data or higher-layer control data, e.g., Layer 3 control data—may be implemented using the data connection. Differently, the data connection may be released in the idle mode. The data connection may include one or more dedicated bears for various services implemented by data communicated along the data connection In the idle mode, it may not be possible to directly commence with a data transmission. Rather, the UE may be required to first connect to the cellular network, e.g., by re-establishment of the data connection. To trigger the UE to re-connect, a DL paging signal may be communicated. The paging signal may be communicated in accordance with a timing of POs.

Various examples described herein relate to UEs that are capable of connecting to the cellular network using two or more identities of the UE. As a general rule, the term identity of the UE as used herein may refer to an identity associated with a subscriber associated with the UE, i.e., a subscriber identity. The identity may include a temporary identity assigned to the UE.

For example, such UEs capable of connecting to the cellular network using two or more identities could comprise multiple SIM chip cards or embedded SIMs. Hereinafter, such UEs that are capable of connecting to the cellular network using multiple identities will be referred to as multi-SIM UEs.

As a general rule, multi-SIM UEs can connect to the same cellular network or to different cellular networks using their multiple identities. For instance, some scenarios are described herein in which a multi-SIM UE connects to different cellular networks.

It is would also be possible to implement such techniques for scenarios in which a multi-SIM UE connects to different core networks of cellular networks, wherein the multiple core networks share a common RAN.

As a general rule, multi-SIM UEs can have one or more communication interfaces. In particular, UEs can have only one communication interface, sometimes called "single radio". To be able to communicate with more than one cellular network, time multiplexing is needed.

Various techniques described herein relate to strategies for time multiplexing of communication associated with multiple identities of a single-radio multi-SIM UE. More specifically, various techniques described herein relate to strategies for time multiplexing (i) payload data communication along a data connection associated with a first identity of the UE, and (ii) paging the UE associated with a second identity of the UE.

The different identities of a multi-SIM UE are typically associated with different subscriptions at respective cellular network. Such subscriptions are associated with a unique identity, e.g., the International Mobile Subscriber Identity (IMSI), and a unique service agreement. For example, policies and charging and/or traffic shaping for telephone calls, short messaging services and packet data or other services can be dependent on the respective service model. As a general rule, if the multi-SIM UE connects to at least one cellular network using a first identity, then a respective IP address, a unique mobile station international subscriber directory number (MSISDN), and a unique data connection with the cellular network can be provisioned. Hence, it can be said that a multi-SIM UE, from a network perspective, will be perceived as two independent UEs.

Various techniques are based on the finding that such behavior of multi-SIM UEs can have an impact on paging and communication. According to various examples described herein, an optimized paging can be implemented for multi-SIM UEs, in particular for scenarios in which a single-radio multi-SIM UE communicates with multiple cellular networks.

One challenge with receiving paging signals from two different cellular networks in parallel is that the POs may overlap. A further challenge is that there is a risk that the timing of the cellular networks drifts since their clock domains are not synchronized. The accuracy of time stability is identical with the frequency accuracy requirements of the RAN node. The minimum requirements frequency errors is equal to 0.05 ppm for all BSs except the smallest ones which have a frequency accuracy better than 0.1 ppm. Thereby, the relative inaccuracy between two BSs may be up to 0.2 ppm. I.e., a drift between the timings of the cellular networks can be up to 17.3 ms/day or close to two frames per day. Thus, there is a risk that even if the POs initially does not overlap, the POs may start to overlap after the UE operating in idle mode in the same cell for some time.

The repetition rate of POs is between 32 ms and 2.56 s, according to various examples. The POs are typically aligned with a discontinuous reception (DRX) cycle of the UE.

Multi-sim UEs may be able to receive paging signals from two cellular networks in parallel, but there may also be the case that the multi-SIM UE operates in connected mode with respect to a first cellular network and contemporaneously further operates in idle mode with respect to a second cellular network. Various techniques are concerned with such a configuration of a multi-SIM UE operating in different modes with respect to different cellular networks.

According to various examples, communication gaps can be created in the communication between the multi-SIM UE and the first cellular network, with respect to which the UE operates in the connected mode. During the communication gaps, the multi-SIM UE can then receive one or more paging signals from the second cellular network.

Various examples relate to the prioritization of services provided by communication with the first cellular network or of services provided by communication with the second network. For example, the UE could prioritize voice or video calls via the second network, when having the established data connection towards the first network.

Thereby, the UE can transition from connected mode in the first network to idle mode in the first network; the UE can establish the data connection towards the second network and hence operate in connected mode with respect to the second network.

FIG. 1 schematically illustrates a cellular network 100. The example of FIG. 1 illustrates the cellular network 100 according to the 3GPP 5G architecture. Details of the 3GPP 5G architecture are described in 3GPP TS 23.501, version 15.3.0 (2017-09). While FIG. 1 and further parts of the following description illustrate techniques in the 3GPP 5G framework of a cellular network, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular network 100. For example, the UE 101 may be one of the following: a cellular phone; a smart phone; an IOT device; a MTC device; a sensor; an actuator; etc.

The UE 101 is a multi-SIM UE 101: the UE 101 is capable of connecting to multiple cellular networks (in FIG. 1 only a single cellular network is illustrated)—using two identities 451, 452.

The UE 101 is connectable to a core network (CN) 115 of the cellular network 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101.

The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The cellular network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination; connection management; reachability management; mobility management; connection authentication; and connection authorization. For example, the AMF 131 controls CN-initiated paging of the UE 101, if the respective UE 101 operates in idle mode. The AMF 131 may trigger transmission of paging signals to the UE 101; this may be time-aligned with POs. After UE registration to the network, the AMF 131 creates a UE context 459 and keeps this UE context, at least as long as the UE 101 is registered to the network. The AMF 131 also provides the UE 101 with a temporary identity, the TMSI.

A data connection 189 is established by the SMF 132 if the respective UE 101 operates in a connected mode. The data connection 189 is characterized by UE subscription information hosted by the UDM 137. To keep track of the current mode of the UE 101, the AMF 131 sets the UE 101 to CM-CONNECTED or CM-IDLE. During CM-CONNECTED, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 via the RAN 111 and the UP 191 of the CN 115 and towards the DN 180. For example, a connection with the Internet or another packet data network can be established. To establish the data connection 189, i.e., to connect to the cellular network 100, it is possible that the respective UE 101 performs a random access (RACH) procedure, e.g., in response to reception of a paging signal. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model.

Figure 2:
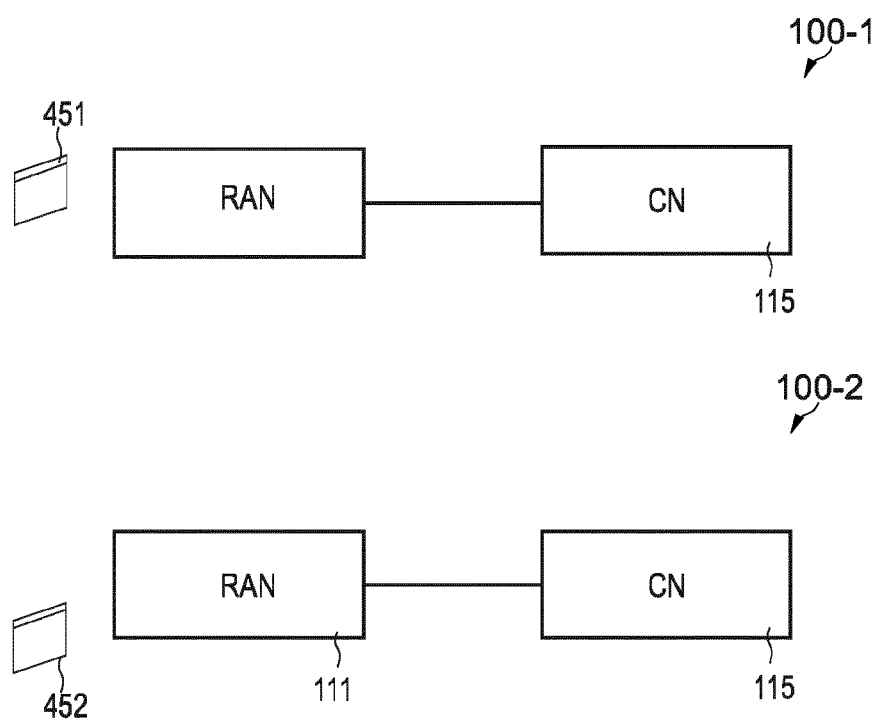
FIG. 2 schematically illustrates communication between a multi-SIM UE and multiple cellular networks according to various examples.

FIG. 2 schematically illustrates aspects with respect to the multiple identities 451, 452. In the scenario of FIG. 2, to cellular networks 100-1, 100-2 are provided. The UE 101 is configured to communicate with the cellular network 100-1 using the identity 451; and is configured to communicate with the cellular network 100-2 using the identity 452.

Each of the cellular networks 100-1, 100-2 can be configured in accordance with the cellular network 100 of FIG. 1. Each cellular network 100-1, 100-2 can store a respective UE context 459 associated with the respective identity 451, 452.

As a general rule, the wireless links 114 supported by the RANs 111 of the cellular networks 100-1, 100-2 can each include one or more carriers, e.g., each carrier providing for Orthogonal Frequency Division Multiplex (OFDM) modulation. Typically, the carriers of the different RANs 111 of different cellular networks 100-1, 100-2 occupy different frequencies.

Figure 3:
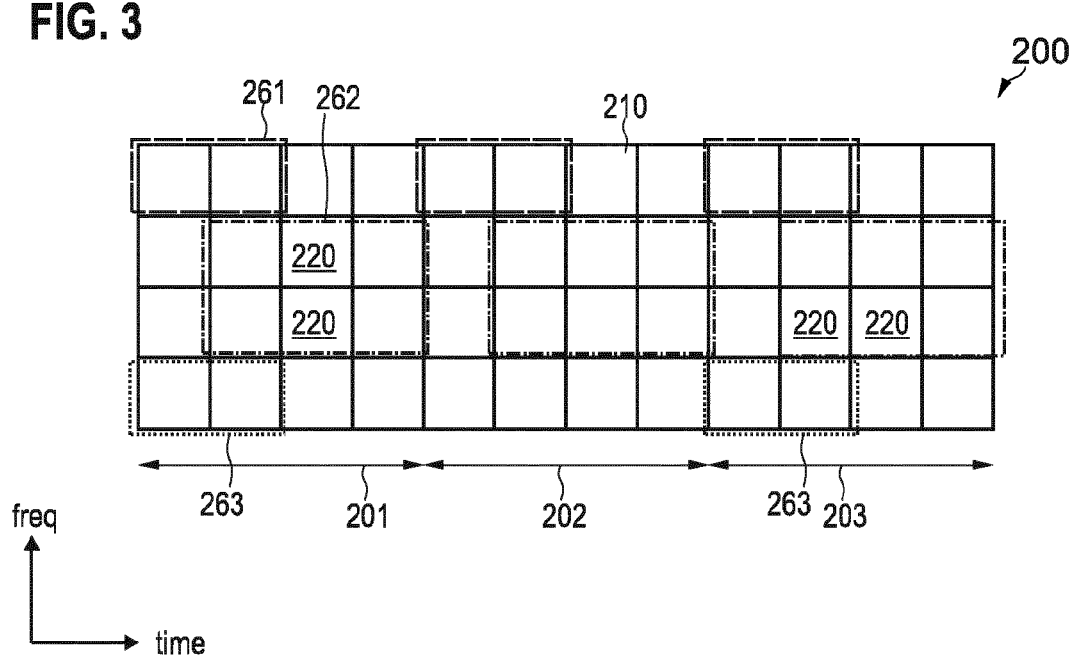
FIG. 3 schematically illustrates a time-frequency resource grid including multiple channels and allocations of time-frequency resources on the channels according to various examples.

FIG. 3 schematically illustrates aspects with respect to a time-frequency resource grid 200 including multiple time-frequency resource elements 210. The time-frequency resource elements 210 are defined by symbols and subcarriers according to the OFDM modulation. Further, the time-frequency resource elements 210 are structured in time domain. For this, frames 201-203 of a protocol implemented by the respective wireless link 114 are provided. The give an example, the frames 201-203 may be implemented by transmission frames, subframes, or timeslots. Typically, a transmission frame includes multiple subframes and a given subframe includes multiple timeslots.

As a general rule, each frame 201-203 has a certain sequence number. The sequence numbers of the frames 201-203 can implement a time reference for the respective cellular network 100-1, 100-2. Synchronization signals indicative of the time reference can be communicated in a respective channel (not illustrated in FIG. 3).

FIG. 3 also illustrates aspects with respect to multiple channels 261-263. In particular, different channels 261-263 can be associated with different time-frequency resource elements 210. Different channels 261-263 can be used for different types of signals. Different channels can use different modulation and coding schemes. Some of the channels may be used for UL communication, while other channels may be used for DL communication.

A first channel (dashed line in FIG. 3)—e.g., implemented as the Physical DL Control Channel (PDCCH) 261—may carry paging indicators, which enable the cellular network 100—e.g., the AMF 131—to page a UE 101 during a PO. The PDCCH 261 may also carry scheduling grants/assignments, sometimes referred to as DL control information (DCI).

Further, a second channel (dashed-dotted line in FIG. 3)—e.g., implemented by the Physical DL Shared Channel (PDSCH) 262—is associated with a payload DL messages carrying higher-layer data. Higher-layer messages may include Radio Resource Control (RRC) control messages, e.g., paging messages. The paging messages can be indicative of the identities of the particular UE to be paged. The PDSCH 262 can also carry messages including payload data from the UP 191.

While in the scenario of FIG. 3 only the PDSCH 262 for DL messages is illustrated, the time-frequency resource grid 200 can also include time-frequency resources 210 allocated to a Physical UL Shared Channel (PUSCH) (not illustrated in FIG. 3). For example, payload UL messages carrying higher-layer data or UP 191 payload data can be communication on the PUSCH.

Further, a third channel (dotted line in FIG. 3)—e.g., implemented by the Physical UL Control Channel (PUCCH) 263—is an UL control channel. The PUCCH 263 could e.g. include scheduling requests, e.g., implemented by a buffer status report (BSR). This can trigger scheduling at the BS 112. Then, a scheduling grant on the PDCCH 261 can be used to indicate allocations 220 on the PUSCH. On the other hand, for scheduling DL data, a DL notification can be transmitted on the PDCCH; and an associated allocation 220 on the PDSCH 262 can be indicated.

Figure 4:
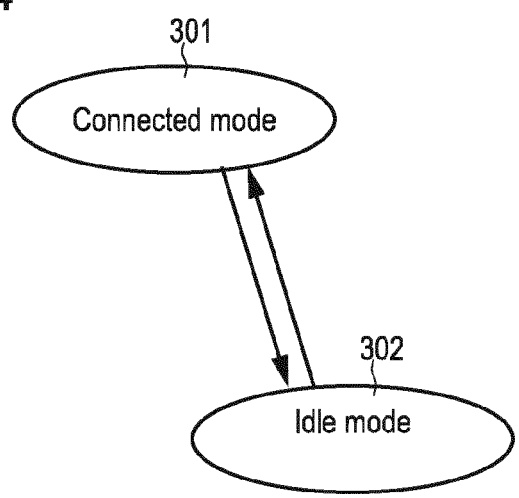
FIG. 4 schematically illustrates various operational modes in which a UE can operate according to various examples.

FIG. 4 illustrates aspects with respect to different modes 301-302 in which the UE 101 can operate. Example implementations of the operational modes 301-302 are described, e.g., in 3GPP TS 38.300, e.g., version 15.0.0.

During a connected mode 301, the data connection 189 is set up. For example, a default bearer and optionally one or more dedicated bearers may be set up between the UE 101 and the cellular network 100. A wireless interface of the UE 101 may persistently operate in an active state, or may implement a discontinuous reception (DRX) cycle.

To achieve a power reduction, it is possible to implement the idle mode 302. When operating in the idle mode 302, the UE 101 is configured to monitor for paging indicators and, optionally, paging messages in accordance with a timing of POs. The timing of the POs may be aligned with a DRX cycle in idle mode 302. This may help to further reduce the power consumption—e.g., if compared to the connected mode 301. In the idle mode 302, the data connection 189 is not maintained, but released.

Figure 5:
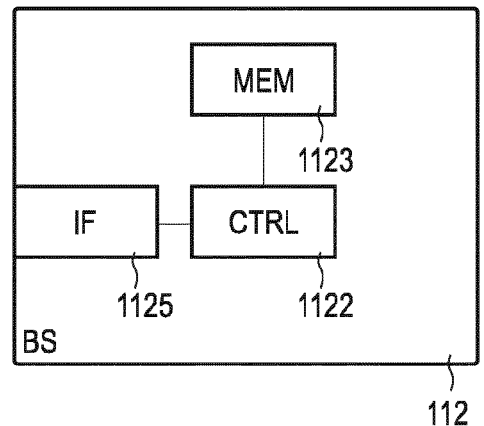
FIG. 5 schematically illustrates a BS of RAN of a cellular network according to various examples.

FIG. 5 schematically illustrates the BS 112. The BS 112 includes an interface 1125. For example, the interface 1125 may include an analog front end and a digital front end. The interface 1125 can also be used for signaling towards the CN 115. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122 by executing the program code, e.g.: scheduling time-frequency resources for data communicated along a data connection and transmitting respective scheduling grants or notifications; receiving a request for one or more communication gaps in the communication along the data connection, e.g., using RRC-based signaling; transmitting an associated acknowledgment; receiving a further request for an extended communication gap; transmitting an associated acknowledgment; scheduling in accordance with such requests.

Figure 6:
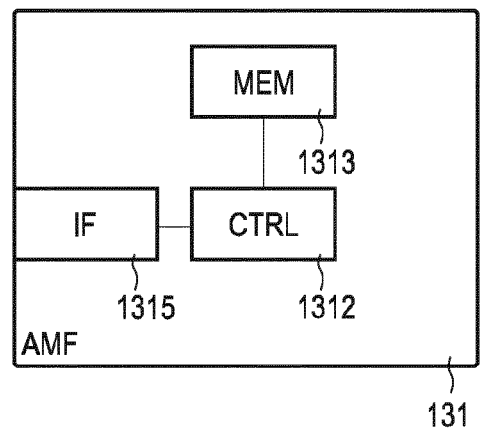
FIG. 6 schematically illustrates a mobility-control node of a core network of a cellular network according to various examples.

FIG. 6 schematically illustrates the AMF 131. The AMF 131 includes an interface 1315. For example, the interface can be for signaling towards the RAN 111. The AMF 131 also includes control circuitry 1312, e.g., implemented by means of one or more processors and software. For example, program code to be executed by the control circuitry 1312 may be stored in a non-volatile memory 1313. In the various examples disclosed herein, various functionality may be implemented by the control circuitry 1312 by executing the program code, e.g.: triggering scheduling of time-frequency resources for data communicated along a data connection by communicating with the BS 112; obtaining a request for one or more communication gaps in the communication along the data connection, e.g., using NAS-based signaling; providing an associated acknowledgment, e.g., using NAS-based signaling; obtaining a further request for an extended communication gap, e.g., using NAS-based signaling; providing an associated acknowledgment; controlling said scheduling in accordance with such requests.

Generally, also other nodes of the cellular network 100 may be configured in a manner comparable to the configuration of the AMF 131, e.g., the SMF 132.

Figure 7:
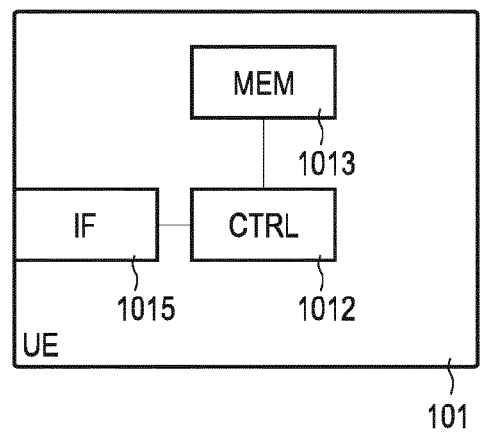
FIG. 7 schematically illustrates a UE according to various examples.
Figure 10:
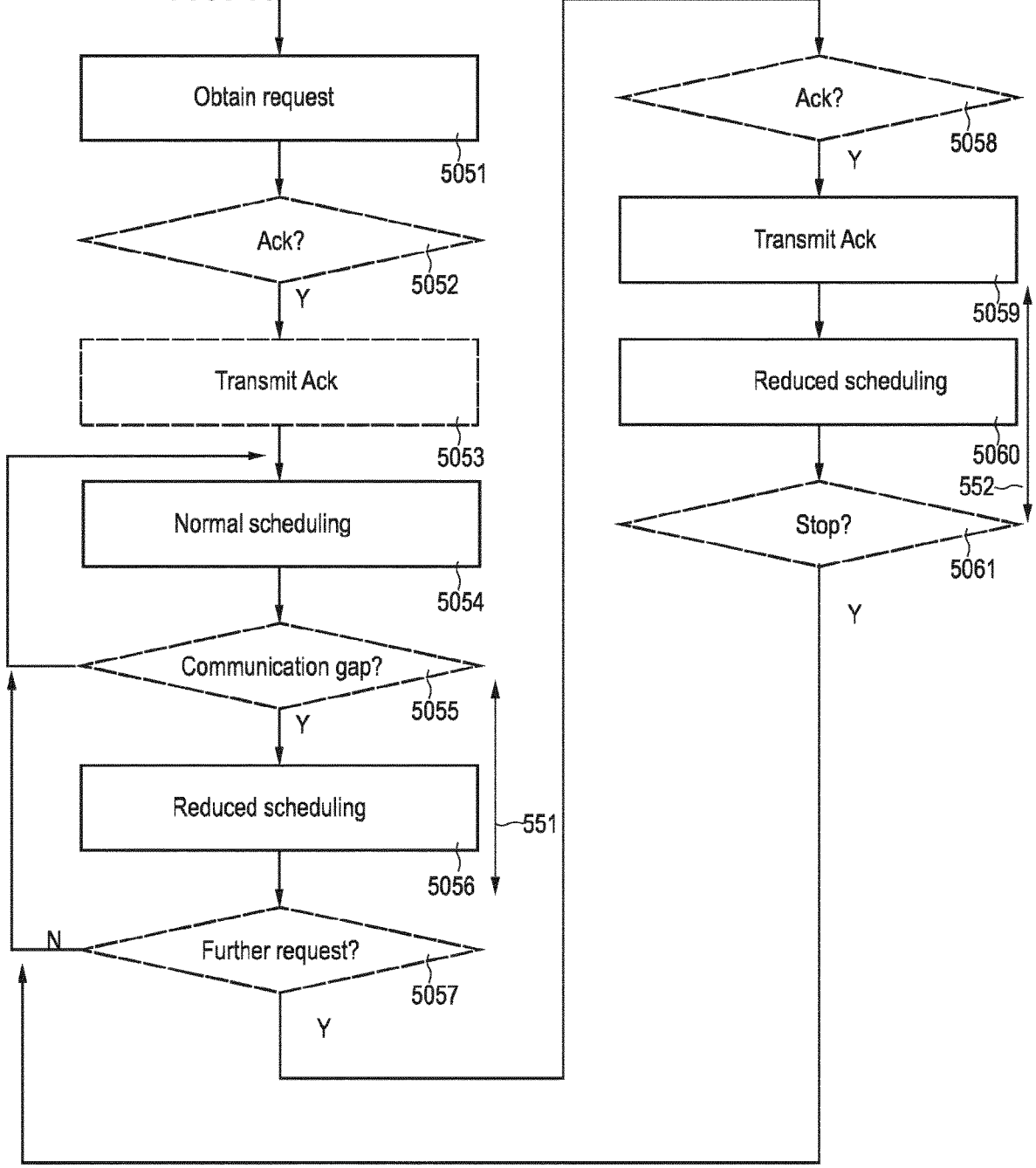
FIG. 10 is a flowchart of a method according to various examples.

FIG. 7 schematically illustrates the UE 101. In the example of FIG. 10, the UE 101 includes a single wireless interface 1015. Thus, the UE 101 can be referred to as single-radio UE 101. For example, the interface 1015 may include an analog front end and a digital front end. For example, the UE 101 may be configured to connect to a cellular network 100, 100-1, 100-2 and to communicate using the respective identity 451, 452, via one and the same interface 1015. Time-duplexing can be employed. The UE 101 also includes control circuitry 1012, e.g., implemented by means of one or more processors and software. For example, program code to be executed by the control circuitry 1012 may be stored in a non-volatile memory 1013. In the various examples disclosed herein, various functionality may be implemented by the control circuitry 1012 by executing the program code, e.g.: transmitting a request for one or more communication gaps in a communication along a data connection 189 with a first cellular network 100-1, e.g., using RRC-based signaling or NAS-based signaling; monitoring, in accordance with the timing of the one or more communication gaps, for one or more paging signals from a second cellular network 100-2; receiving one or more paging signal such as paging indicators and/or paging messages; controlling the interface 1015 to switch between frequencies of a wireless link associated with multiple cellular networks 100-1, 100-2; etc.

Figure 8:
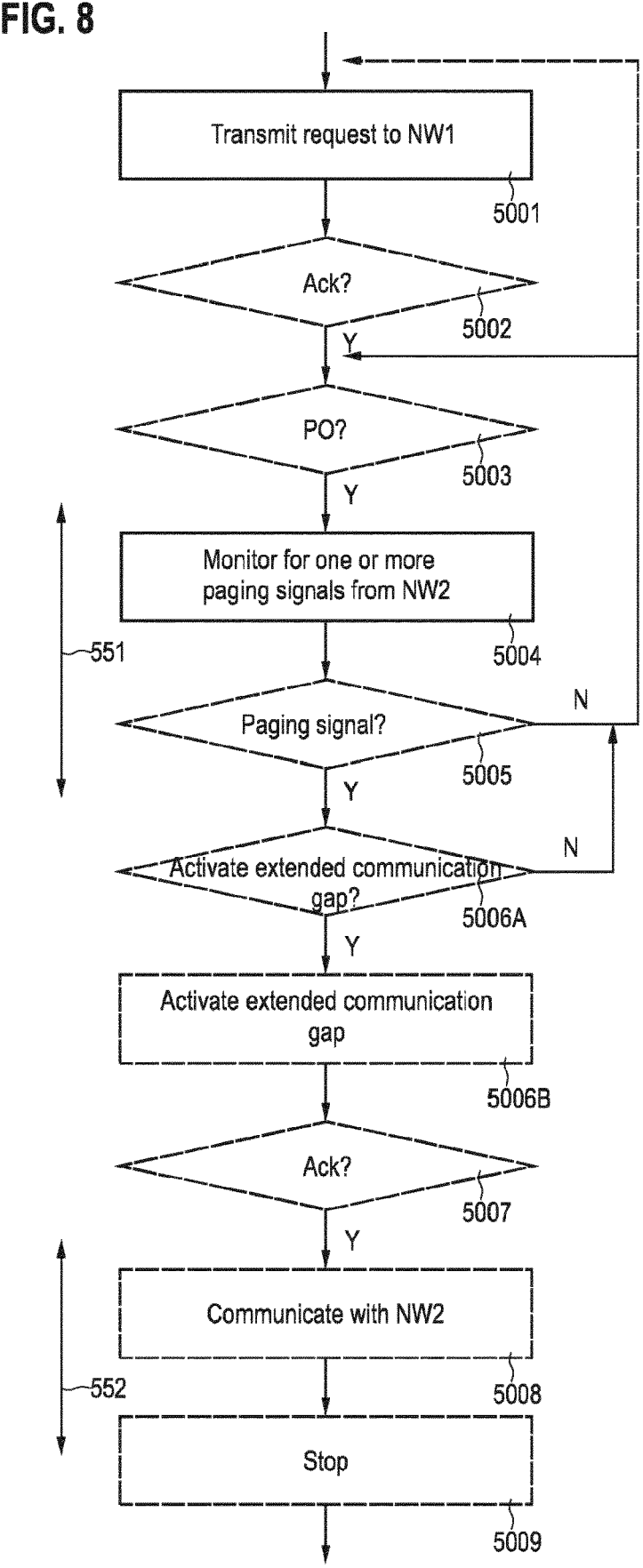
FIG. 8 is a flowchart of a method according to various examples.

FIG. 8 is a flowchart of a method according to various examples. The method of FIG. 8 can be executed by a UE. For example, the method according to FIG. 8 could be executed by the control circuitry 1012 of the UE 101, e.g., upon load respective program code from the memory 1013 (cf. FIG. 7). Various examples will be described hereinafter for a scenario in which the method according to FIG. 8 is executed by the UE 101 for sake of simplicity, but similar techniques may be readily employed for other scenarios in which the method according to FIG. 8 is executed by other devices or nodes.

Optional blocks are labeled with dashed lines in FIG. 8.

At and prior to block 5001, the UE 101 operates in the connected mode 301 with respect to the cellular network 100-1. This means that the data connection 189 between the UE 101 and the cellular network 100-1 is set up; this data connection 189 is associated with the identity 451.

At block 5001, the UE 101 transmits a request to the cellular network 100-1. The request is for one or more communication gaps 551 in the communication along the data connection 189 between the UE 101 and the cellular network 100-1.

As a general rule, various options are available for transmitting the request. To give an example, the request could be implemented as an RRC control message, e.g., on the PUSCH. It would also be possible that the request is implemented as control signaling on the PUCCH 263. It would also be possible that the request is transmitted via the NAS control connection between the UE 101 and the AMF 131. Thus, as will be appreciated, the request is transmitted in a control message that is associated with the first identity 451.

At optional block 5002, the UE 101 checks whether an acknowledgment is received. This block 5002 could be implemented by monitoring for a positive acknowledgment or a negative acknowledgment.

If a positive acknowledgment is received at block 5002 (or if a negative acknowledgment is not received), then the method commences with block 5003.

At block 5003, the UE 101 checks whether a PO for the cellular network 100-2 occurs. The timing of the PO could be determined based on the associate second identity 452. For example, for 3GPP 5G NR, a modulus 1024 calculation of the S-TMSI used for communication with the cellular network 100-2 could be performed to determine the timing of the PO.

The timing of the PO is time-aligned with the communication gaps 551 in the communication along the data connection 189 between the UE 101 and the cellular network 100-1, as requested in block 5001.

Accordingly, the UE 101 does not have to expect any communication along the data connection 189 implemented on the PDSCH 262 or the PUSCH. More specifically, the UE 101 does not have to expect any associated scheduling grants or scheduling assignments for allocations 220 for communication along the data connection 189 on these channels.

This allows the UE 101, at 5004, to monitor for one or more paging signals that are associated with the identity 452 in accordance with the timing of the communication gaps 551. For example, the UE 101 could monitor for paging indicators, e.g., on the PDCCH of the wireless link 114 of the cellular network 100-2, during or within a respective communication gap 551. The UE 101 may also monitor for paging messages.

For example, the communication gaps 551 may be provided with a margin if compared to the POs of the one or more paging signals associated with the identity 452, to provide for some headroom to absorb a timing drift. I.e., the communication gaps 551 can be longer than the POs. This can be taken into consideration when monitoring for the one or more paging signals in accordance with the timing of the communication gaps 551. Optionally, the headroom may also be provided to accommodate for further communication during the communication gaps 551, e.g., a random access procedure and/or a RRC connection procedure.

As a general rule, it would be possible to provide the communication gaps 551 with a margin if compared to the POs of the one or more paging signals to provide for the headroom to absorb the timing drift. Alternatively or additionally, it would be possible to provide the communication gaps 551 with a margin if compared to the POs of the one or more paging signals to enable a switching of the frequency at the wireless interface 1015. This may include tuning one or more analog bandpass filters.

At block 5004, the interface 1015 can be controlled to switch the frequency accordingly. For example, one or more adaptive bandpass filters in analog domain could be controlled accordingly. Block 5004 could include blind decoding of the PDCCH or, optionally, monitoring for a wake-up signal before attempting to decode the PDCCH.

In case it is decided, at block 5005, that one or more relevant paging signals are received at block 5004, the method commences at block 5006A.

Otherwise, the method jumps back to block 5001 or block 5003. In this regard, it would be possible that the request of block 5001 or the acknowledgment of block 5002 is for multiple instances of the communication gap 551. Then, these multiple communication gaps 551 can be time-aligned with multiple POs. This has the advantage of reduced control signaling overhead: The method can thus jump back to block 5003, without have to re-request a further communication gap 551. In case there is a sequence of communication gaps 551 and the timing of the cellular networks 100-1, 100-2 are sliding (timing drift), it may be feasible to repetitively transmit a timing correction of the sequence now and then. The sliding of the timings is typically quite slow if compared to the repetition rate of the communication gaps 551 of the sequence, so the timing correction can be transmitted seldomly, e.g., at a repetition rate of seconds, minutes or even hours. The repetition rate of the timing correction can depend depending on a margin of the communication gaps 551 around the PO, given by the length of the communication gap 551 with respect to the length of the PO.

In another scenario, a further request for a further communication gap 551 may be transmitted at a further iteration of block 5001. The latter scenario has the advantage that a time-alignment between the POs and the respective communication gap 551 can be controlled by the timing of the respective request. Timing drifts between the timing of the cellular network 100-1 and the timing of the cellular network 100-2 can thereby inherently be accounted for, if the communication gap 551 is in a well-defined timing relationship with the request transmitted at block 5001 (e.g., offset by a certain count of frames 201-203 of the wireless link 114 of the cellular network 100-1). The UE 101 can control the timing of the communication gap 551 by means of the timing of the transmission of the request at block 5001.

At optional block 5006A, the UE 101 checks whether to activate or to not activate an extended communication gap 552. As a general rule, activation of the extended communication gap 552 upon receiving at least one paging signal, e.g., a paging indicator and/or a paging message, can be conditional. Possible trigger criteria include at least one of a type of the service of the data connection 189 towards the cellular network 100-1, a type of a further service associated with a further data connection 189 associated with the second identity 452 (i.e., for which the paging is received at block 5005), and a user-preference setting.

For example, the user preference setting may be received via a human-machine-interface (HMI) of the UE 101, e.g., via a graphical user interface (GUI). For example, the user preference setting may pertain to whether the user of the UE 101 prioritizes communication associated with the first identity 451 over a communication associated with the second identity 452, or vice versa. One example of this could be that the user of the phone prioritizes connecting to the cellular network 100-2 over an on ongoing call implemented as a service of the data connection 189 towards the cellular network 100-1. The HMI could for example present several alternatives to the user related to this, and the user may choose. As a general rule, the user preference setting may be predefined, i.e., before receiving any paging signals at block 5004; our could be received from the HMI in response to receiving one or more paging signals from the cellular network 100-2. For example, the user may specify via the HMI: certain services can be prioritized higher than other services. To give an example, a real-time service such as a voice or video call could be prioritized higher than a non-real-time service such as social-media messaging.

For example, the type of the further service could be read from a connection cause value of a paging message received at block 5005. It would also be possible that the connection cause value is included in RRC signaling of a RRC connection setup procedure. Here, corresponding RRC signaling can be accommodated in the communication gap 551.

In case the extended communication gap is to be activated at block 5006A, the method commences with block 5006B. At block 5006B, the extended communication gap 552 is activated. The activation is thus in response to receiving the one or more paging signals at block 5004.

As a general rule, various options are available for activating the extended communication gap 552. In a first example, the UE 101 may silently activate the extended communication gap 552, e.g., without transmitting an explicit indication of the extended communication gap 552 to the cellular network 100-1. The cellular network 100-1 may still obtain an implicit indication of the extended communication gap 552, e.g., by monitoring whether the UE 101 responds to control signals such as DL scheduling assignments. In a second example, the UE 101 transmits an indication to the cellular network 100-1; this can inform the cellular-network about the activation of the extended communication gap 552. In a third example, the UE 101 transmits a further request to the cellular network 100-1. The further request is for the extended communication gap 552. As a general rule, various options are available for transmitting the further request, if required, at block 5006B. To give an example, the further request could be implemented as a RRC control message on the PUSCH. It would also be possible that the request is implemented as control signaling on the PUCCH 263. It would also be possible that the further request is transmitted via the NAS control connection between the UE 101 and the AMF 131 of the cellular network 100-1. Thus, as will be appreciated, the further request is again transmitted in a control message associated with the first identity 451.

At optional block 5007, the UE 101 checks whether an acknowledgment associated with the further request of block 5006B (if transmitted) is received from the cellular network 100-1. Again, this could include checking whether a positive acknowledgment is received, or checking whether a negative acknowledgment does not received.

Then, the method commences with block 5008. In block 5008, further communication of the UE 101 and the cellular network 100-2 takes place. This communication is during the extended communication gap 552 and uses the second identity 452.

As a general rule, various types of communication may take place at block 5008. To give a few examples: the UE 101 may monitor for a paging message from the cellular network 100-2, wherein the paging message is indicative of the second identity 452. Monitoring for the paging message can include decoding the PDSCH 262 of the wireless link 114 provided by the RAN 111 of the cellular network 100-2. Alternatively or additionally, the communication taking place at block 5008 may include participating in a connection procedure to establish a data connection 189 with the cellular network 100-2. This can include a random-access procedure and an RRC connection procedure. The data connection 189 is then associated with the second identity 452. Alternatively or additionally, the communication taking place at block 5008 may include transmitting data along this data connection 189 between the UE 101 of the cellular network 100-2.

The particular communication taking place at block 5008 may depend on a duration of the communication gap 551 as requested in block 5001. For example, if the communication gap 551 requested in block 5001 is dimensioned comparably long, then sufficient headroom time may be available to monitor for and receive the paging message during the communication gap 551 or even perform the random-access procedure, etc.; on the other hand, if the communication gap 551 is dimensioned comparably short, then it may be required to monitor for and receive the paging message during the extended communication gap 552.

As a general rule, the duration of the extended communication gap 552 could be predefined. I.e., the end of the extended communication gap 552 could be defined prior to start. This helps to simplify operation and limits control signaling overhead.

Optionally—as illustrated in FIG. 8—the UE 101 may transmit, to the cellular network 100-1, an indication to stop the extended communication gap 552. This means that the extended communication gap 552 can be a-priori open end. This can mean that a corresponding control signal could be transmitted on the PUCCH or PUSCH or a NAS control connection. Then, normal scheduling of data along the data connection 189 between the UE 101 and the cellular network 100-1 can commence.

A release of the data connection 189 to the cellular network 100-1 can be suppressed during the communication gap 551 and the extended communication gap 552, to avoid inadvertent disconnection of the UE 101. This may include overriding or temporarily re-setting one or more inactivity timers at the BS 112 and/or other nodes of the cellular network 100-1.

As a general rule, various options are available for implementing the indication to stop the extended communication gap 552. To give a few examples, in a first option, the UE 101 could suspend transmitting BSRs during the extended communication gap 552; the indication to stop the extended communication gap 552 could then be implemented by resuming the transmission of BSRs, i.e., could be specifically implemented by the first BSR transmitted by the UE 101 on the PUCCH 263 after the extended communication gap 552. In a second option, the indication could be included in an RRC control message, e.g., transmitted on the PUSCH towards the cellular network 100-1. In a specific example, the BS 112 of the cellular network 100-1 may periodically transmit UL scheduling grants, during the extended communication gap 552 and even without a corresponding UL scheduling request. Then, the UE 101 could transmit the indication as part of a control message, e.g., an RRC UL control message on the PUSCH using the allocation 220 associated with the UL scheduling grant. In a third option, in case the radio connection is stopped during the gap the indication could be implemented as a random access message. In a fourth option, the indication could be transmitted as a NAS control message to the AMF 131. In a fifth option, the UE 101 could transmit a scheduling request to the BS 112 of the cellular network 100-1, to indicate that the extended communication gap 552 is to be stopped.

Further details with respect to the method according to FIG. 8 are explained in connection with the signaling diagram of FIG. 9.

Figure 9:
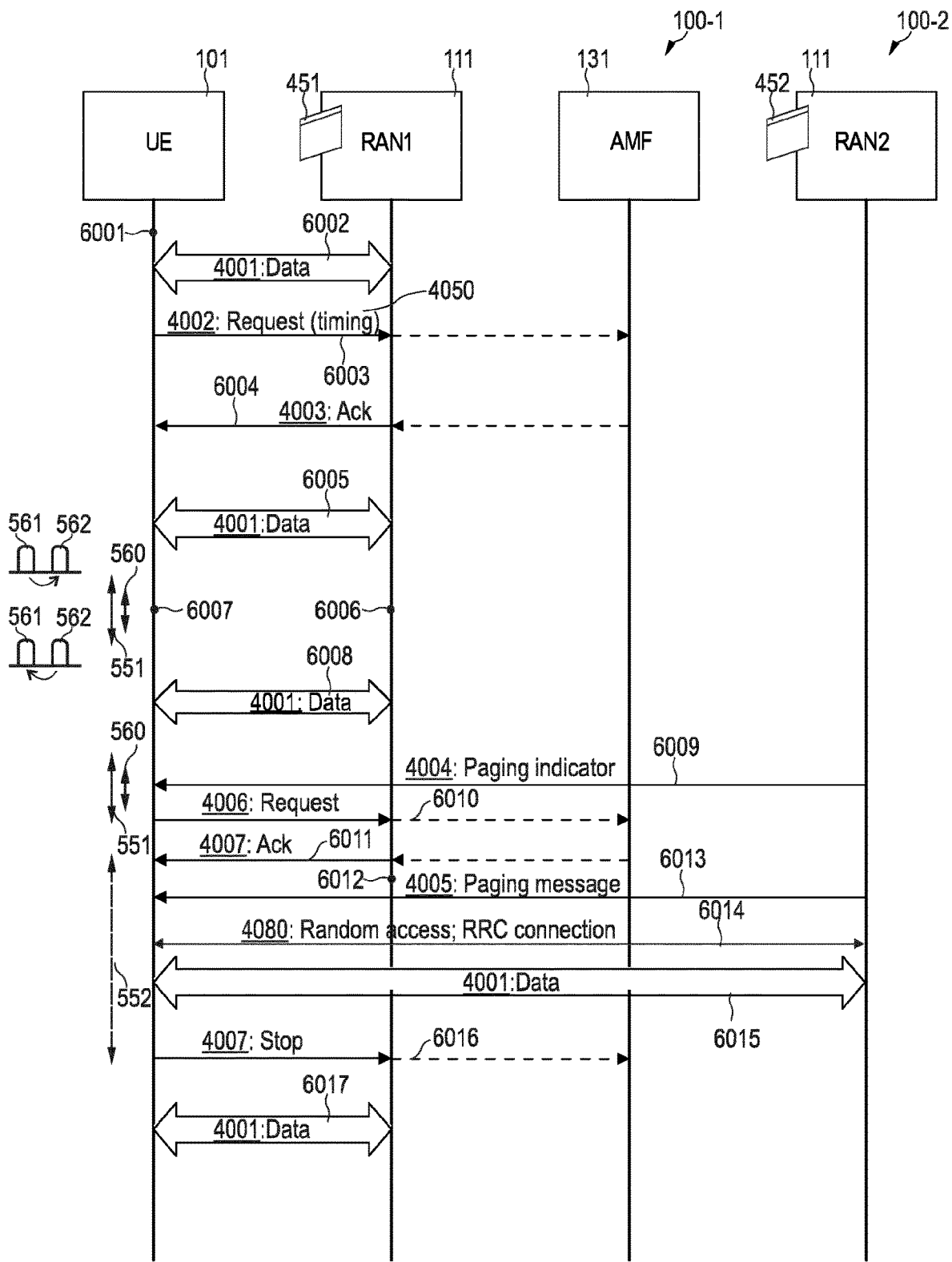
FIG. 9 is a signaling diagram according to various examples.

FIG. 9 is a signaling diagram illustrating aspects with respect to the communication between the UE 101 and the network 100-1, as well as between the UE 101 and the network 100-2. As mentioned above in connection with FIG. 2, the communication between the UE 101 and the network 100-1 is generally using the first identity 451; while the communication between the UE 101 and the network 100-2 is generally using the second identity 452.

At 6001, the UE 101 operates in the connected mode 301 with respect to the cellular network 100-1; and operates in the idle mode 302 with respect to the cellular network 100-2.

Accordingly, at 6002, UL or DL data 4001 is communicated along the data connection 189 between the UE 101 and the cellular network 100-1. For example, the data 4001 may be associated with one or more specific services, e.g., web browsing, voice call, video call, etc.

At 6003, the UE 101 transmits, to the cellular network 100-1, a request 4002. The request 4002 is for one or more communication gaps 551 in the communication along the data connection 189 between the UE 101 and the cellular network 100-1. As illustrated in FIG. 9, the request 4002 could be obtained at the BS 112 of the RAN 111 or at the AMF 131. 6003 thus corresponds to block 5001 (cf. FIG. 8).

At 6004, the cellular network 100-1—e.g., the BS 112 or the AMF 131—acknowledges the request 4002 by transmitting a corresponding positive acknowledgment 4003. The UE receives the acknowledgement 4003. This corresponds to block 5002 (cf. FIG. 8).

At 6005, UL or DL data 4001 is still communicated along the data connection 189 between the UE 101 of the cellular network 100-1.

Then, during the communication gap 551, at 6006, the BS 112 does not schedule any allocations 220 for further data 4001 for transmission along the data connection 189 between the UE 101 and the cellular network 100-1. There are no allocations 220 available on, e.g., the PDSCH or the PUSCH. Thus, the BS 112 configures the scheduling in accordance with the timing of the communication gap 551.

As illustrated in FIG. 9, the UE 101 can control the interface 1015 to switch from a first frequency or frequencies 561 associated with the wireless link 114 provided by the RAN 111 of the cellular network 100-1 to a second frequency or frequencies 562 associated with the wireless link 114 provided by the RAN 111 of the cellular network 100-2, at the beginning of the communication gap 551. The first frequency or frequencies 561 and the second frequency or frequencies 562 are non-overlapping. The first frequency or frequencies 561 are associated with a first carrier that defines a first time-frequency resource grid 200; and the second frequency or frequencies 562 are associated with a second carrier that defines a second time-frequency resource grid 200.

Thus, at 6007, the UE 101 can monitor for paging signals transmitted by the RAN 111 of the cellular network 100-2. In the example of FIG. 9, a paging event does not occur and, thus, paging signals are not transmitted at 6007.

At the end of the communication gap 551, the UE 101 can control the interface 1015 to switch from the second frequency or frequencies 562 to the first frequency or frequencies 561; such that at 6008, communication of data 4001 along the data connection 189 between the UE 101 of the cellular network 100-1 can again commence, in accordance with allocations 220 scheduled by the BS 112 of the RAN 111.

Note that in FIG. 9 for the further communication gaps 551, 552 the switching between the frequencies 561, 562 is not illustrated for sake of simplicity, but also takes place.

In the example of FIG. 9, the request 4002 is for multiple communication gaps 551. Thus, multiple communication gaps 551 re-occurring in time are pre-defined (in other scenarios, another request 4002 may be transmitted).

At the next communication gap 551, a paging indicator 4004 is transmitted by the BS 112 of the RAN 111 of the cellular network 100-2, at 6009. The UE 101 receives the paging indicator 4004.

This triggers the UE 101 to transmit, at 6010, a further request 4006 for the extended communication gap 552 to the cellular network 100-1, e.g., the BS 112 or the AMF 131. The cellular network 100-1 acknowledges the further request 4006 by transmitting a positive acknowledgement 4007, at 6011. This corresponds to blocks 5006B and 5007 (cf. FIG. 8).

The further request 4006 can thus be for a single extended communication gap 552—while, at least in some examples, the request 4002 is for multiple communication gaps 551.

As a general rule, it would be possible that the further request 4006 is optional. It would accordingly be possible that the positive acknowledgement is optional. In some examples, the UE 101 may autonomously decide to activate the extended communication gap 552. In other words, the UE 101 may autonomously decide to extend the communication gap 551, by means of the extended communication gap 552. This has been explained in detail with respect to block 5006A in FIG. 8. The activation of the extended communication gap 552 can be in response to reception of at least one paging signal of one or more paging signals, e.g., triggered by said receiving of the paging indicator 4004.

During the extended communication gap 552, at 6012, again the cellular network 100-1 does not schedule allocations 220 for data to be communicated along the data connection 189 between the UE 101 of the cellular network 100-1. Thus, the UE 101 can control the interface 1015 to switch to the frequency or frequencies 562, to thereby receive the paging message 4005. The paging message 4005 is transmitted by the BS 112 of the RAN 111 of the cellular network 100-2 and the paging message 4005 is associated with the identity 452.

In the example of FIG. 9, the UE 101 then commences—during the extended communication gap 552—to establish a further data connection 189 between the UE 101 and the cellular network 100-2. This can include a random-access procedure and a RRC connection setup 4080, at 6014. Then, data 4001 is communicated between the UE 101 and the cellular network 100-2 along the data connection 189 between the UE and the cellular network 100-2, at 6015. This corresponds to block 5008 (cf. FIG. 8).

While in the example of FIG. 9 the paging message 4005 is communicated during the extended communication gap 552, in other examples, the paging message 4005 can also be communicated during the communication gap 551. This gives more time to communicate the request 4006 and receive the acknowledgment 4007.

At 6016, the UE 101 transmits an indication 4008 to stop the extended communication gap 552. Thus, after the end of the extended communication gap 552, data 4001 can be communicated between the UE 101 and the cellular network 100-1 along the respective data connection 189, at 6017. The BS 112 of the RAN 111 of the cellular network 100-1 can appropriately configure the scheduling of allocations 220 on the PDSCH or the PUSCH.

As illustrated in FIG. 9, the timing of the communication gap 551 is aligned with the timing of a PO 560 for paging by the cellular network 100-2. As a general rule, the cellular networks 100-1, 100-2 may not be synchronized. Hence, there may be a timing drift between the timing references of the cellular networks 100-1, 100-2. To achieve the alignment between the timing of the communication gaps 551 and the POs 560 nonetheless, various strategies can be used. An example option is illustrated in FIG. 9. Here, the UE 101 determines the timing of the communication gaps 551 based on the timing of the POs 560. This can correspond to a sequence of communication gaps 551. The timing of the POs 560 is associated with the second identity 452. For example, the timing of the POs 560 could be determined based on a modulus calculation of the S-TMSI. More specifically, the UE 101 determines the timing of the communication gaps 551 in a time reference of the cellular network 100-1, e.g., based on respective synchronization signals received from the cellular network 100-1. This could mean that the UE 101 determines the timing, e.g., with respect to sequence numbers of frames 201-203 of the wireless link 114 of the cellular network 100-1. The UE 101 could determine the timing in absolute numbers—e.g., by specifying one or absolute sequence numbers—or in relative terms—e.g., by specifying an offset, e.g., an offset count of sequence numbers of the frames 201-203. Then, the UE 101 can inform the cellular network 100-1 about the timing of the communication gaps 551. The UE 101 can transmit a corresponding indicator 4050, which in the example of FIG. 9 is piggybacked to the request 4002 (but which could be generally also transmitted separately).

As a general rule, there can be a continuous time drift between the timing of the cellular networks 100-1, 100-2. The UE 101 could determine the timing drift based on tracking first synchronization signals from the cellular network 100-1 and further tracking second synchronization signals from the cellular network 100-2. Thus, even if the indicator 4050 is transmitted at a first point in time, at a later second point in time—due to the timing drift—a misalignment between the timing of the communication gaps 551 and the timing of the POs 560 can result. To compensate for such timing drift, it would be possible that the UE 101 repetitively transmits an update of the indicator 4050 to the cellular network 100-1 (timing correction). For example, a repetition rate with which the update is transmitted can scale with the magnitude of the timing drift. This could be on the order of seconds or minutes or even hours or days or months.

Alternatively to such an update of the indicator 4050, it would be possible to transmit a new request 4002.

FIG. 10 is a flowchart of a method according to various examples. The method of FIG. 10 could be implemented by a BS, e.g., by the control circuitry 1122 of the BS 112 of the RAN 111 of the cellular network 100-1, upon loading program code from the memory 1123. It would also be possible that the method of FIG. 10 is implemented by a mobility control node of a core network of a cellular network, e.g., by the AMF 131 of the cellular network 100-1. Hereinafter, techniques will be described in connection with an example implementation by the BS 112 of the RAN 111 of the cellular network 100-1, but these techniques may be readily applied to other implementation scenarios.

At block 5051, the BS 112 obtains (more specifically, receives) the request 4002 for one or more communication gaps 551, during which the UE 101 intends to monitor for paging indicators 4004 and optionally for paging messages 4005 from the cellular network 100-2. Block 5051 is interrelated to block 5001.

At block 5052, the BS 112 checks whether it intends to grant the request 4002. Possible decision criteria that can be taken into account in block 5052 may include a buffer level, quality of service requirements, a network load, etc.

As a general rule, block 5052 is optional. In some examples, the UE 101 may merely provide an explicit or implicit indication of the communication gap 551. For example, the UE 101 may transmit an indication to the BS 112, thereby informing about the communication gap 551. A respective indicator may be transmitted to the BS 112, e.g., using NAS control signaling or RRC control signaling or the like. Here, the BS 112 does not need to check whether it intends to grant a respective request 4002.

In case the request 4002 (if used) is granted, the BS 112 may transmit an associated positive acknowledgment 4003, at block 5053. Otherwise, a negative acknowledgment may be transmitted (not illustrated in FIG. 10). As a general rule, the positive or negative acknowledgement is optional: for example, a silent acknowledgement may be used where the BS 112 does not confirm the grant of the request 4002. In case the request 4002 is not transmitted altogether (but, e.g., rather an indication of the extended communication gap 552), then 5053 is not required, as well.

At block 5054 the BS 112 implements normal scheduling for data 4001 communicated along the data connection 189 between the UE 101 and the cellular network 100-1 until the communication gap 551.

At block 5055, it is checked whether a communication gap 551 occurs. For this, a corresponding timing can be checked. Timer values may be read-out. For example, a corresponding indicator 4050 indicative of the timing of the one or more communication gaps 551 as requested at block 5051 could be included in the request 4002 received at block 5051, or be separately received. The BS 112 does not need to be aware of the second identity 452 associated with time-aligned POs 560 (cf. FIG. 9) to determine the timing of the one or more communication gaps 551. Also, the BS 112 does not need to be aware of the timing of the cellular network 100-2. This can be achieved by implementing the indicator 4050 in the time reference of the cellular network 100-2. Appropriate updates of the indicator 4050 can be repetitively received from the UE 101, to compensate for any timing drift between the timings of the cellular networks 100-1, 100-2 (the updates are not shown in FIG. 8, FIG. 9, and FIG. 10).

If the communication gap 551 is detected at block 5055, the method commences with block 5056. Here, scheduling of allocations 220 for communication of data 4001 along the data connection 189 can be reduced, e.g., if compared to the normal scheduling of block 5054. I.e., fewer or no allocations 220 could be scheduled during the communication gap 551 if compared to outside the communication gap 551—in particularly relatively defined with respect to transmit buffer levels or income rates of data into the transmit buffers. For example, the buffer levels for DL or UL data 4001 may be larger within the communication gap 551 if compared to outside the communication gap 551. Accordingly, the scheduling of data 4001 of the communication along the data connection 189 is configured in accordance with the timing of the communication gap 551.

Release of the data connection 189 may be suppressed during the communication gap 551.

After the end of the communication gap 551, normal scheduling can commence.

At block 5057, it is checked whether an indication of the extended communication gap 552 or a further request 4006 is received. Block 5057 is interrelated to block 5006B (cf. FIG. 8).

In case the further request 4006 is received, at block 5058, it may be checked whether the further request 4006 should be granted. Decision criteria similar to the decision criteria of block 5052 can be considered at block 5058. In case the further request 4006 should be granted, at block 5059 and acknowledgment may be transmitted; also, silent acknowledgement may be possible. Block 5059 thus corresponds to block 5007 (cf. FIG. 8).

Block 5057 and 5058 can be optional. In particular, it would be possible that the UE 101 silently activates an extended communication gap 552. Then, instead of implementing the explicit indication to the network, it would be possible to monitor whether the UE 101 responds to DL control signaling, to thereby obtain an indication of whether the extended communication gap 552 has been activated.

Again, the scheduling can be reduced at block 5060, if compared to the scheduling at block 5054. I.e., fewer or no allocations 220 could scheduled during the time of the extended communication gap 552.

Release of the data connection can be suppressed during block 5060.

At block 5061 it is checked whether the extended communication gap 552 is to be stopped, e.g., based on UL signaling of the UE 101 (cf. FIG. 9: 6016). This UL signaling could be supported by respectively reserved allocations 220 scheduled by the BS 112 during the extended communication gap 552. These reserved allocation 220 may not be used for UP 191 payload data. Block 5061 is inter-related with block 5009.

As explained in connection with the preceding FIGS., the scheduling of allocations 220 for data 4001 to be transmitted along the data connection 189 between the UE 101 and the cellular network 100-1 can be reduced or altogether stopped during the communication gap 551 and during the extended communication gap 552. This can cause an impairment of any service—e.g., generally a voice or video call, messaging, web browsing, social media platforms, or video streaming to give a few non-limiting examples of services—provided by the communication along the data connection 189 that is associated with the first identity 451 and that is in between the UE 101 and the cellular network 100-1.

Techniques of mitigating such impairment of a service are described next in connection with FIG. 11.

Figure 11:
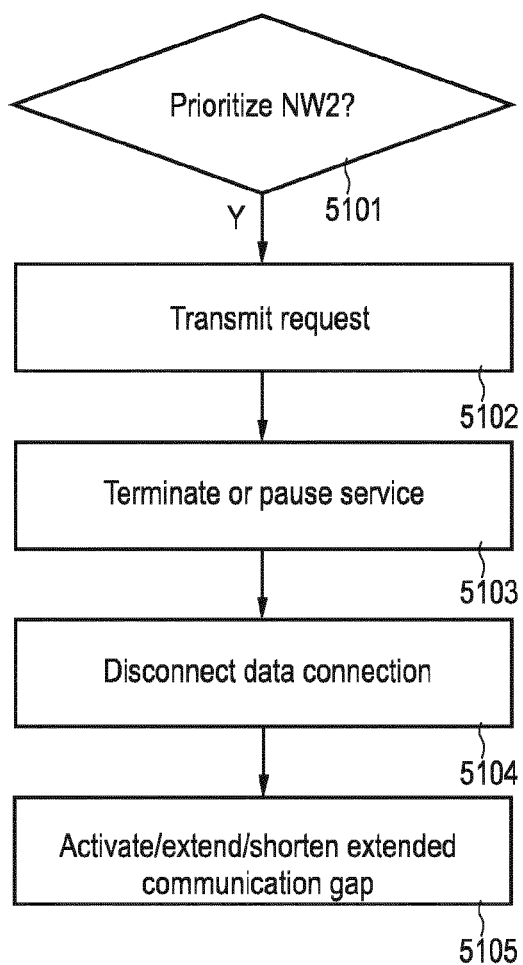
FIG. 11 is a flowchart of a method according to various examples.

FIG. 11 is a flowchart of a method according to various examples. For instance, the method of FIG. 11 could be executed by a UE, e.g., by the control circuitry 1012 of the UE 101, e.g., upon loading program code from the memory 1013. Hereinafter, techniques are described in connection with such an implementation of the method by the UE 101, but similar techniques may be readily implemented by other nodes and devices.

The method of FIG. 11 can be executed in the context of the method of FIG. 8 and/or the method of FIG. 10.

At block 5101, one or more prioritization criteria with respect to (i) communication between the UE 101 and the cellular network 100-1 vis-à-vis (ii) communication between the UE 101 of the cellular network 100-2 are checked. More specifically, as illustrated in FIG. 11, it may be checked whether (ii) communication between the UE 101 of the cellular network 100-2 is to prioritized vis-á-vis (i) communication between the UE 101 of the cellular network 100-1.

Example prioritization criteria can include, but are not limited to: a type of a service provided by the communication along the data connection 189 associated with the first identity 451, i.e., between the UE 101 of the cellular network 100-1; a type of a service provided by the communication along a further data connection 189 associated with the second identity 452, i.e., between the UE 101 and the cellular network 100-2; and a user preference setting.

For example, the user preference setting may be received via a human-machine-interface (HMI) of the UE 101, e.g., via a graphical user interface (GUI). For example, the user preference setting may pertain to whether the user of the UE 101 prioritizes communication associated with the first identity 451 over a communication associated with the second identity 452, or vice versa. One example of this could be that the user of the phone prioritizes connecting to the cellular network 100-2 over an on ongoing call implemented as a service of the data connection 189 towards the cellular network 100-1. The HMI could for example present several alternatives to the user related to this, and the user may choose. As a general rule, the user preference setting may be predefined, i.e., before receiving any paging signals, our could be received from the HMI in response to receiving one or more paging signals from the cellular network 100-2. For example, the user may specify via the HMI: certain services can be prioritized higher than other services. To give an example, a real-time service such as a voice or video call could be prioritized higher than a non-real-time service such as social-media messaging.

Depending on the check at block 5101, different prioritization measures may be taken. The method of FIG. 11 includes multiple prioritization measures associated with the blocks 5102-5104. As a general rule, only one or some of these prioritization measures may be taken, or alternatively or additionally other prioritization measures may be taken.

A first example prioritization measure is illustrated in connection with block 5102. At block 5102, the UE 101 transmits the request for the one or more communication gaps 551 to have the possibility of monitoring for paging signals from the cellular network 100-2. For example, where the communication between the UE 101 of the cellular network 100-2 would not be prioritized vis-à-vis the communication between the UE 101 and the cellular network 100-1, the request for the one or more communication gaps 551 would not be transmitted and another paging strategy may be implemented, e.g., an opportunistic strategy.

A second example of prioritization measures is illustrated in connection with block 5103. At block 5103, the UE 101 triggers a termination or pause of the service provided by the communication along the data connection 189 associated with the first identity 451. For example, the cellular network 100-1 may be informed accordingly. For example, a dedicated bearer of the data connection 189 associated with the service may be released, when terminating the service (albeit the data connection 189 is maintained). For example, a buffer at a gateway node, e.g., at the UPF 121, may be implemented when pausing the service. For example, release of the data connection 189 or a bearer associated with the data connection may be suppressed when pausing the service. For example, such prioritization measure may be taken in response to receiving the paging indicator 4004 or the paging message 4005 from the cellular network 100-2.

A third example of prioritization measures is illustrated in connection with block 5104. At block 5104, the UE 101 disconnects the data connection 189 associated with the first identity 451. For example, such prioritization measure may be taken in response to receiving the paging indicator 4004 or the paging message 4005 from the cellular network 100-2.

A fourth example of prioritization measures is illustrated in connection with block 5105. At block 5105, the UE 101 decides whether a longer or shorter extended communication gap 552 is required for communicating data with the cellular network 100-2, or whether the extended communication gap 552 is to be activated at all. For example, since the UE 101 may not know the reason of the paging until it has done a connection request (e.g., RRC connection cause value), the UE 101 may make the extended communication gap 552 shorter or longer, e.g., depending on the service type and an associated prioritization of this service type (cf. block 5061 of FIG. 10).

As a general rule, it would be possible that the UE 101 transmits to the cellular network 100-1 and indication indicative of the one or more prioritization measures to be taken during the communication gap 551 or during the extended communication gap 552.

Summarizing, above, techniques have been described that facilitate efficient paging of a multi-SIM UE in a second cellular network, while the UE is in connected mode in a first cellular network. More efficient paging can, in particular, be achieved if compared to reference implementations in which, e.g., the UE switches frequencies to monitor POs of the second cellular network without informing the first cellular network. Such a reference implementation results in inefficient use of resources in the first cellular network, e.g., scheduling assignments may be lost. It would also be possible that the UE is inadvertently disconnected from the first cellular network in such uncoordinated reference implementations.

The techniques described herein add signaling which is aimed to support a single-radio multi-SIM UE, where the UE operates in connected mode with respect to a first cellular network and in idle mode with respect to a second cellular network. Network-controlled communication gaps for the connected mode are implemented, giving the UE the possibility to read paging signals of the second cellular network with respect to which the UE operates in idle mode.

One benefit of reading the paging signals in the second cellular network is that the UE or user can prioritize which connection is most important. For example, if the user is surfing on Internet on the first network and there is an there is an incoming paging signal for a voice connection on the second cellular network, then the user may prioritize to read the paging signal and answer the incoming voice call on the cost of the communication gap of the service associated with the surfing on the Internet. Another case is when the UE is connected mode on the first network and receives a message, SMS, mail or similar, in the second cellular network; then the UE may receive the message on the second cellular network and then continue with the connection on the first cellular network. Here, the service provided by the communication on the data connection between the UE and the first cellular network is paused.

Techniques have been described in which the UE autonomously creates communication gaps in DL and UL of the first cellular network with respect to which the UE operates in connected mode; in order to monitor for paging signals from the second network in the DL. The UE can request these communication gaps either by NAS or RRC signaling or Layer 1 signaling in PUCCH; and the first cellular network confirms the request by accepting the request or the first network silently accepts the request by not confirming it with an acknowledgement. For long lasting connection, it would be an advantage that the signaling is handled in RRC, since that would allow the UE to re-schedule the communication gaps due to network time domain drift.

During the communication gaps, the scheduling module of the RAN of the first cellular network would then not schedule any DL allocations on time-frequency resources or provide any UL resource grants. This allows the UE to skip reading and transmitting the data in the corresponding frame or frames needed to monitor for the paging signals and, e.g., performing channel measure on the other network. These communication gaps can occur periodically or re-occurring, since the DRX cycle and associated POs are periodic. The timing of the communication gap(s) is signaled to the first cellular network, so that the first cellular network does not have to provide allocations of resources in UL and DL to the UE during these communication gaps.

By creating these communication gaps, the UE is aware of that the quality of the services provided via communication with the first cellular network might be somewhat degraded. But the benefit is that the connection to both networks are supported also during the connected mode.

Further, examples have been described in which, when the UE is paged on the second cellular network (meaning that the second identity of the UE is sent in a paging message), the UE may immediately send a further request to the first cellular network to which it is currently connected. The further request indicates that the communication gap needs to be prolonged in order to respond to the received paging indicator or paging message. The further request is thus for an extended communication gap. The UE may, e.g., get a voice call on the second cellular network which it prioritizes and disconnects the data connection with the first cellular network. It would also be possible that it is, e.g., a message to the UE which it may receive and then the UE continues with the previous connection. In such a scenario, the connection cause associated with the one or more paging signals is signaled to the UE. The connection to the first cellular network is put on hold (e.g., paused or suspended) during the time to identify what activities that are requested in the second cellular network. Based on this information the UE can prioritize what connection is most important what connection to put on hold or disconnect, etc.

During POs, the UE reads the paging signals and detects whether the ID of the UE (S-TMSI) is in the received paging message (periodic communication gaps). In case the ID of the UE is in the paging message, the UE shall connect to the second cellular network by performing the random access procedure and transition into the connected mode, from the idle mode. Therefore in case the UE is paged, the one-time extended communication gap can be used to allow time for receiving/transmitting radio signals from/to the second cellular network. The UE stops the reception and transmission on the first cellular network during this extended communication gap and requests the first cellular network to configure the scheduling of allocations of the respective data connection accordingly. Also, this one-time further request could be efficiently handled by RRC signaling between the UE and the first cellular network, e.g., the BS.

The one-time further request for the extended communication gap could have a defined end time. Or alternatively after the communication gap, or at the end of the extended communication gap, the first cellular network may schedule allocation to the UE with a low data rate in UL. Thereby, the UE—when it is ready—reads the UL allocations of the first cellular network and can start to transmit UL data or a dummy packet so that the first cellular network detects that the UE is active again and ready for both DL/UL traffic from/to the first cellular network. Another option would be to transmit a scheduling request so that the first cellular network detects that the UE is active again and ready for both DL/UL traffic from/to the first cellular network. Thus, the UE can indicate to the first cellular network to stop the extended communication gap. The UE may reconnect to the first cellular network and the first cellular network synchronizes with the UE again. The UE can start listening to the DL for UL allocations when the activities on the second cellular network is finalized and it can send a signal to stop the extended communication gap to the first cellular network that it is ready.

During the extended communication gap, the first cellular network may generally suppress any release of the data connection to the UE. This means that, e.g., an inactivity timer may be overridden. This avoids that the UE is disconnected from the first cellular network during the extended communication gap. This helps to limit control signaling overhead, because a random-access procedure and/or RRC connection procedure may be avoided.

If the first cellular network does not know how long the UE activities towards the second cellular network are lasting, it may continue with a small allocation during the extended communication gap, so the UE can report to the first cellular network directly after its towards the second cellular network actions are finalized that it is active again using these small allocation. The UE may receive fill allocations.

Furthermore, based on the decision and actions in the paging process, the UE can either continue with the connection to the first cellular network, or it may even disconnect that connection towards the first cellular network and move to the second cellular network for a connection there. This corresponds to a prioritization of the service provided via the second cellular network with respect to the service provided via the first cellular network.

When the timing of the POs of the second cellular network slides/drifts compared with the timing of the communication gaps implemented by the first cellular network, the UE shall be able to send the timing offset to the first cellular network so that the timing of the communication gaps is updated accordingly. When the timing between the first and second cellular networks is sliding/drifting, it shall be possible to update the timing of the communication gaps so that the paging events in the second cellular network are available for the UE to read. Since the communication gaps are managed from the UE and in some examples periodic communication gaps are requested from the first cellular network, the timing just needs to be updated due to the sliding.

The techniques described herein help the first cellular network—with respect to which the UE operates in connected mode—to predict and optimize the scheduling of allocations of time-frequency resources.

The techniques described herein help to prevent unintentional implicit de-tach events in the second cellular network if a UE does not respond to a paging signals.

Summarizing, the following EXAMPLEs have been described:

EXAMPLES

EXAMPLE 1. A method of operating a wireless communication device (101), the method comprising:
  transmitting (5001), to a first communication network (100-1), a request (4002) for one or more communication gaps (551) in a communication along a data connection (189) associated with a first identity (451) of the wireless communication device (101), and
  monitoring (5004), in accordance with a timing of the one or more communication gaps (551), for one or more paging signals (4004, 4005) from a second communication network (100-2), the one or more paging signals (4004, 4005) being associated with a second identity (452) of the wireless communication device (101).

EXAMPLE 2. The method of EXAMPLE 1, further comprising:
  in response to receiving at least one of the one or more paging signals (4004, 4005): activating an extended communication gap (552), and
  communicating (5008) with the second communication network (100-2) during the extended communication gap (552).

EXAMPLE 3. The method of EXAMPLE 2,
  wherein said activating of the extended communication gap (552) comprises transmitting (5006), to the first communication network (100-1), an indication of the extended communication gap (552) or a further request (4006) for the extended communication gap (552).

EXAMPLE 4. The method of EXAMPLE 2 or 3,
  wherein said communicating with the second communication network (100-2) during the extended communication gap comprises at least one of: monitoring for a paging message (4005) of the one or more paging signals, the paging message (4005) being associated with the second identity; or participating in a connection procedure with the second communication network (100-2) to establish a further data connection (189) associated with the second identity (452); or communication data along the further data connection (189).

EXAMPLE 5. The method of any one of EXAMPLEs 2 to 4,
  wherein a duration of the extended communication gap (552) is predefined.

EXAMPLE 6. The method of any one of EXAMPLEs 2 to 4, further comprising:
  transmitting (5009), to the first communication network (100-1), an indication (4008) to stop the extended communication gap (552).

EXAMPLE 7. The method of any one of EXAMPLEs 2 to 6,
  wherein the extended communication gap (552) is selectively activated or wherein a duration of the extended communication gap (552) is set, depending on at least one of a type of the service, a type of a further service associated with a further data connection (189) associated with the second identity (452), and a user-preference setting.

EXAMPLE 8. The method of any one of the preceding EXAMPLEs,
  wherein a first wireless link (114) of the first communication network (100-1) operates on a first frequency (561),
  wherein a second wireless link (114) of the second communication network (100-2) operates on a second frequency (562),
  wherein the method further comprises:
    controlling a wireless interface (1015) of the wireless communication device (101) to switch from the first frequency (561) to the second frequency (562) and from the second frequency (562) to the first frequency (561) in accordance with the timing of the one or more communication gaps (551).

EXAMPLE 9. The method of any one of the preceding EXAMPLEs, further comprising:
  determining the timing of the one or more communication gaps (551) based on a timing of paging occasions (560) associated with the second identity (452), the timing being determined in a time reference of the first communication network (110-1).

EXAMPLE 10. The method of any one of the preceding EXAMPLEs, further comprising:
  transmitting an indicator (4050) indicative of the timing of the one or more communication gaps (551) to the first communication network (100-1).

EXAMPLE 11. The method of EXAMPLE 10, further comprising:
  in accordance with a timing drift between the first communication network (110-1) and the second communication network (110-2): repetitively transmitting an update of the indicator (4050) indicative of the timing to the first communication network (100-1).

EXAMPLE 12. The method of any one of the preceding EXAMPLEs, further comprising:
  upon receiving at least one of the one or more paging signals (4004, 4005): triggering a termination or pause of a service provided by the communication along the data connection (189) associated with the first identity (451), or disconnecting the data connection (189) associated with the first identity (451).

EXAMPLE 13. The method of EXAMPLE 12,
  wherein said triggering of the termination or pause of the service provided by the communication along the data connection (189) associated with the first identity (451), or said disconnecting of the data connection (189) associated with the first identity (451) is selectively executed depending on at least one of a type of the service, a type of a further service associated with a further data connection (189) associated with the second identity (452), and a user-preference setting.

EXAMPLE 14. The method of any one of the preceding EXAMPLEs,
  wherein the request (4002) is selectively transmitted depending on at least one of a type of the service, a type of a further service associated with a further data connection (189) associated with the second identity (452), and a user-preference setting.

EXAMPLE 15. A method of operating a node (112, 131, 132) of a first communication network (100-1), the method comprising:
  obtaining (5051), from a wireless communication device (101), a request (4002) for one or more communication gaps (551) in a communication along a data connection (189) associated with a first identity (451) of the wireless communication device (101), the one or more communication gaps (551) being for one or more paging signals (4004, 4005) from a second communication network (100-2), and configuring (5054, 5056) scheduling of allocations (220) for data (4001) of the communication in accordance with a timing of the one or more communication gaps (551).

EXAMPLE 16. The method of EXAMPLE 15, further comprising:
obtaining an indication of an extended communication gap (552) or a further request (4006) for an extended communication gap (552), the extended communication gap (552) being for further communication between the wireless communication device (101) and the second communication network (100-2), and
configuring (5054, 5060) the scheduling of the allocations (220) for the data (4001) of the communication in accordance with a timing of the extended communication gap (552).

EXAMPLE 17. The method of EXAMPLE 16, further comprising:
suppressing a release of the data connection during the extended communication gap (552).

EXAMPLE 18. A wireless communication device (101) comprising a control circuitry (1012) configured to:
transmit (5001), to a first communication network (100-1), a request (4002) for one or more communication gaps (551) in a communication along a data connection (189) associated with a first identity (451) of the wireless communication device (101), and
monitor (5004), in accordance with a timing of the one or more communication gaps (551), for one or more paging signals (4004, 4005) from a second communication network (100-2), the one or more paging signals (4004, 4005) being associated with a second identity (452) of the wireless communication device (101).

EXAMPLE 19. The wireless communication device (101) of EXAMPLE 18, wherein the control circuitry (1012) is configured to perform the method of any one of EXAMPLEs 1 to 14.

EXAMPLE 20. A node (112, 131, 132) of a first communication network (100-1), the node (112, 131, 132) comprising control circuitry (1122, 1312) configured to:
obtain (5051), from a wireless communication device (101), a request (4002) for one or more communication gaps (551) in a communication along a data connection (189) associated with a first identity (451) of the wireless communication device (101), the one or more communication gaps (551) being for one or more paging signals (4004, 4005) from a second communication network (100-2), and
configure (5054, 5056) scheduling of allocations (220) for data (4001) of the communication in accordance with a timing of the one or more communication gaps (551).

EXAMPLE 21. The node (112, 131, 132) of EXAMPLE 20, wherein the control circuitry (1122, 1312) is configured to perform the method of any one of EXAMPLEs 15 to 17.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, techniques have been described above in which communication gaps are implemented at the BS of a RAN of a cellular network. Similar techniques may be readily applied in which at least a part of the logic is located at a mobility-control node, e.g., and AMF.

For further illustration, various techniques have been described in which the communication gaps are used by the UE to monitor for paging signals. Alternatively or additionally, the communication gaps could also be used for other purposes, e.g., channel measurements on the frequencies of the wireless link provided by the second cellular network with respect to which the UE operates in the idle mode.

For further illustration, various examples have been described in which the UE 101 transmits a request (e.g., request 4006) for the extended communication gap 552 to the cellular network 100-1. In other examples, other options are available for activating the extended communication gap 552. For instance, the UE 101 could even autonomously activate the extended communication gap 552. Then, the UE 101 may merely transmit an information indicator to the cellular network 100-1, thereby providing indication to the cellular network 100-1 of the extended communication gap 552. In other examples, the UE 101 may even refrain from explicitly indicating to the cellular network 100-1 the activation of the extended communication gap 552: In such a case, the cellular network 100-1 may be implicitly informed about the activation of the extended communication gap 552 when the UE 101 does not respond to, e.g., DL scheduling messages or other signals. As a general rule, the trigger criteria for the activation of the extended communication gap 552 can be, e.g., receipt of at least one paging signal of one or more paging signals, e.g., receipt of a paging indicator and optionally receipt of a paging message.

For further illustration, while various examples have been described in which the first cellular network 100-1 checks whether to grant or deny a request for one or more communication gaps, in some examples, the first cellular network may be preconfigured to always grant the request.

For further illustration, while various examples have been described with respect to an implementation in which a request for one or more communication gaps is transmitted by the UE, the UE may also autonomously activate the one or more communication gaps and merely transmit a respective indication to the first cellular network.

The invention claimed is:

1. A method of operating a wireless communication device, the method comprising:
transmitting, to a first communication network, a request for one or more communication gaps in a communication along a data connection associated with a first identity of the wireless communication device,
monitoring, in accordance with a timing of the one or more communication gaps, for one or more paging signals from a second communication network, the one or more paging signals being associated with a second identity of the wireless communication device,
in response to receiving at least one of the one or more paging signals: activating an extended communication gap, and
communicating with the second communication network during the extended communication gap.

2. The method of claim 1,
wherein said activating of the extended communication gap comprises transmitting, to the first communication network, an indication of the extended communication gap or a further request for the extended communication gap.

3. The method of claim 1,
wherein said communicating with the second communication network during the extended communication gap comprises at least one of: monitoring for a paging message of the one or more paging signals, the paging message being associated with the second identity; or participating in a connection procedure with the second communication network to establish a further data connection associated with the second identity; or communication data along the further data connection.

4. The method of claim 1,
wherein a duration of the extended communication gap is predefined.

5. The method of claim 1, further comprising:
transmitting, to the first communication network, an indication to stop the extended communication gap.

6. The method of claim 1,
wherein the extended communication gap is selectively activated or wherein a duration of the extended communication gap is set, depending on at least one of a type of the service, a type of a further service associated with a further data connection associated with the second identity, and a user-preference setting.

7. The method of claim 1,
wherein a first wireless link of the first communication network operates on a first frequency,
wherein a second wireless link of the second communication network operates on a second frequency,
wherein the method further comprises:
controlling a wireless interface of the wireless communication device to switch from the first frequency to the second frequency and from the second frequency to the first frequency in accordance with the timing of the one or more communication gaps.

8. The method of claim 1, further comprising:
determining the timing of the one or more communication gaps based on a timing of paging occasions associated with the second identity, the timing being determined in a time reference of the first communication network.

9. The method of claim 1, further comprising:
transmitting an indicator indicative of the timing of the one or more communication gaps to the first communication network.

10. The method of claim 9, further comprising:
in accordance with a timing drift between the first communication network and the second communication network: repetitively transmitting an update of the indicator indicative of the timing to the first communication network.

11. The method of claim 1, further comprising:
upon receiving at least one of the one or more paging signals: triggering a termination or pause of a service provided by the communication along the data connection associated with the first identity, or disconnecting the data connection associated with the first identity.

12. The method of claim 11,
wherein said triggering of the termination or pause of the service provided by the communication along the data connection associated with the first identity, or said disconnecting of the data connection associated with the first identity is selectively executed depending on at least one of a type of the service, a type of a further service associated with a further data connection associated with the second identity, and a user-preference setting.

13. The method of claim 1,
wherein the request is selectively transmitted depending on at least one of a type of the service, a type of a further service associated with a further data connection associated with the second identity, and a user-preference setting.

14. A method of operating a node of a first communication network, the method comprising:
obtaining, from a wireless communication device, a request for one or more communication gaps in a communication along a data connection on a first wireless link of the first communication network that operates on a first frequency, the data connection is associated with a first identity of the wireless communication device, the one or more communication gaps being for one or more paging signals from a second communication network having a second wireless link that operates on a second frequency, and
configuring scheduling of allocations for data of the communication in accordance with a timing of the one or more communication gaps,
obtaining an indication of an extended communication gap or a further request for an extended communication gap, the extended communication gap being for further communication between the wireless communication device and the second communication network using the second frequency, and
configuring the scheduling of the allocations for the data of the communication in accordance with a timing of the extended communication gap.

15. The method of claim 14, further comprising:
suppressing a release of the data connection during the extended communication gap.

16. A wireless communication device comprising a control circuitry configured to:
transmit, to a first communication network, a request for one or more communication gaps in a communication along a data connection associated with a first identity of the wireless communication device,
monitor, in accordance with a timing of the one or more communication gaps, for one or more paging signals from a second communication network, the one or more paging signals being associated with a second identity of the wireless communication device,
in response to receiving at least one of the one or more paging signals: activate an extended communication gap, and
communicate with the second communication network during the extended communication gap.

17. A node of a first communication network, the node comprising control circuitry configured to:
obtain, from a wireless communication device, a request for one or more communication gaps in a communication along a data connection on a first wireless link of the first communication network that operates on a first frequency, the data connection is associated with a first identity of the wireless communication device, the one or more communication gaps being for one or more paging signals from a second communication network having a second wireless link that operates on a second frequency, and
configure scheduling of allocations for data of the communication in accordance with a timing of the one or more communication gaps,
obtain an indication of an extended communication gap or a further request for an extended communication gap, the extended communication gap being for further communication between the wireless communication device and the second communication network using the second frequency, and configure the scheduling of the allocations for the data of the communication in accordance with a timing of the extended communication gap.

\* \* \* \* \*